Sept. 24, 1957     D. G. TAYLOR ET AL     2,807,794
ATTITUDE INDICATING APPARATUS Filed Oct. 20, 1955     3 Sheets-Sheet 1

INVENTOR.
DANIEL G. TAYLOR
ROBERT J. KUTZLER
BY
Roger W. Jensen
ATTORNEY

Sept. 24, 1957  D. G. TAYLOR ET AL  2,807,794
ATTITUDE INDICATING APPARATUS

Filed Oct. 20, 1955  3 Sheets-Sheet 3

INVENTOR.
DANIEL G. TAYLOR
ROBERT J. KUTZLER
BY
Roger W. Jensen
ATTORNEY

United States Patent Office 2,807,794
Patented Sept. 24, 1957

2,807,794

ATTITUDE INDICATING APPARATUS

Robert J. Kutzler, St. Louis Park, and Daniel G. Taylor, Minneapolis, Minn., assignors to Minneapolis-Honeywell Regulator Company, Minneapolis, Minn., a corporation of Delaware Application October 20, 1955, Serial No. 541,728

10 Claims. (Cl. 340—27)

This invention pertains generally to attitude indicating apparatus for dirigible craft such as aircraft and more specifically to an all-attitude indicator having a unique configuration.

Modern jet aircraft are required to execute a wide variety of acrobatic maneuvers in the course of their military duties. Their assignments include attack, interception, escort, and a variety of bomb-delivery techniques. These involve practically every known type of airplane maneuver, including loops, Chandelles, Immelmann turns, rolls, vertical climbs, dives, and the like. In all of these maneuvers, the pilot needs a continuous, correct, and instantly recognized indication of airplane orientation in three axes: heading, roll, and pitch.

Generally speaking, the prior art all-attitude indicators had a spherical configuration which has several attractive features but also suffers from the fact that a sphere lacks the symbolism really needed for a quick perception of attitude indication. It is of a completely neutral shape, and, when attempts are made to add symbolism to it by marking it with colors and direction lines, it simply becomes confusing and illogical. The present all-attitude indicator is based upon the answer to the question "what basic data does the pilot need in acrobatic maneuvers?" Basically, the pilot wants to know which way is "up" and what are the compass directions.

He is not engaged in great-circle navigation and to him the earth is a flat plane beneath him, not a sphere. It is purely academic to him, in a pull-up from a northerly flight path, that at 89° from the horizontal he is still flying north and at 91° from the horizontal he is flying south. However, he would like to know where north and south are to control the direction of flight resulting from the maneuver.

The all-attitude indicator of the present invention has a shape which has a logical symbolism that is suited to the job and lacks the confusing connotations of the spherical type all-attitude indicators. First, the pilot needs an arrow which he can associate in his mind only with "up." An arrowhead, when rotated, generates a cone which retains a point to be associated with "up" and has an unmistakable visual character when viewed from any direction. The bottom of the cone is a flat disc with a visual character of its own, readily distinguishable from the top of the cone and capable of carrying additional marks for azimuth direction.

The preferred embodiment of the subject all-attitude indicator then consists of a cone of approximately 30° total included angle. The cone pierces a flat disc (or collar), forming a compass card and marked on the edge as well as the top and bottom with azimuth data. Suitable identifying marks can be employed to make the pilot's determination of orientation substantially instantaneous. The shape of the cone assembly provides the pilot with the visual cues necessary to completely and accurately define the airplane attitude. Further, the heading information will be both readable and useable during those portions of the maneuver at or near vertical.

An object of the invention therefore is to provide an improved attitude indicating device.

A further object of the invention is to provide an attitude indicating device having a logical symbolism, suited to the job, and lacking confusing connotations.

Another object of the invention is to provide an attitude indicating device which will continuously tell the pilot which way is "up" and what are his compass directions.

Still another object of the invention is to provide an attitude indicator comprising a cone portion piercing a flat disc (or collar) forming a compass card.

Other and more specific objects of the invention will be set forth more fully in and become apparent from a reading of the following specification and appended claims, in conjunction with the accompanying drawings in which:

Figure 1:
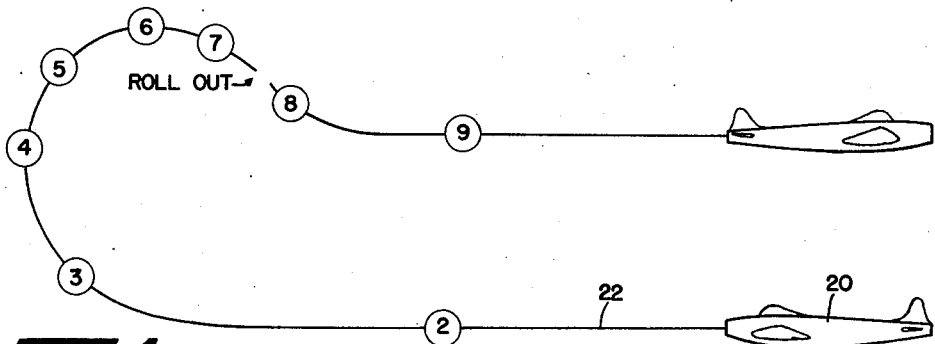
Figure 1 shows the flight path that an aircraft would follow while doing an Immelmann turn, the aircraft position during various parts of the turn being identified by successive circles enclosing numerals 2–9 inclusive.
Figure 2:
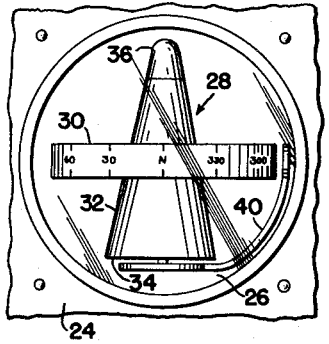
Figure 2 is a side elevation view of the subject all-attitude indicator and is similar to the view presented to the pilot in position 2 of the flight path shown in Figure 1.
Figure 5:
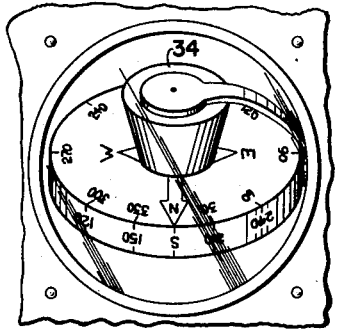
Figure 6:
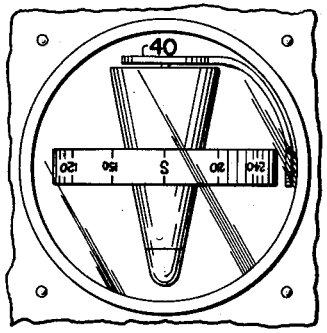
Figure 7:
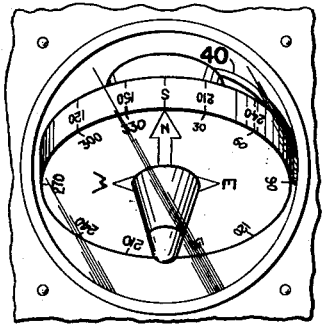
Figure 8:
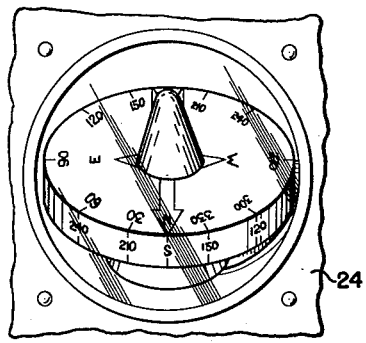
Figure 9:
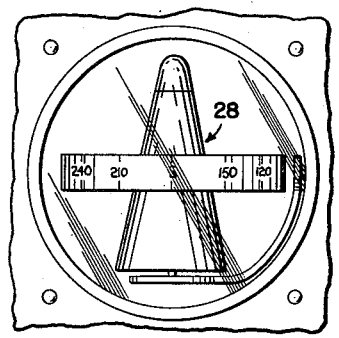
Figure 10:
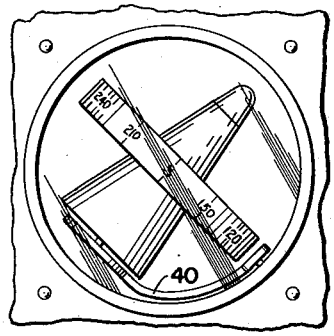
Figure 11:
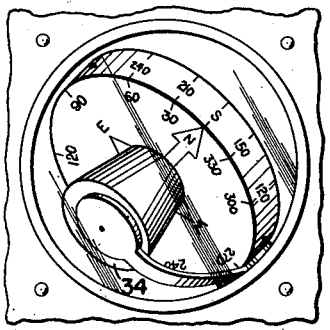
Figure 12:
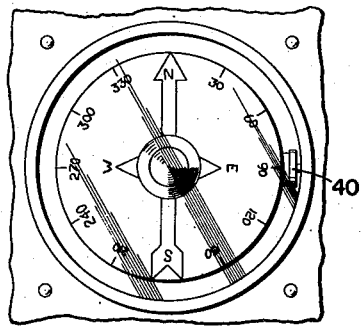
Figure 13:
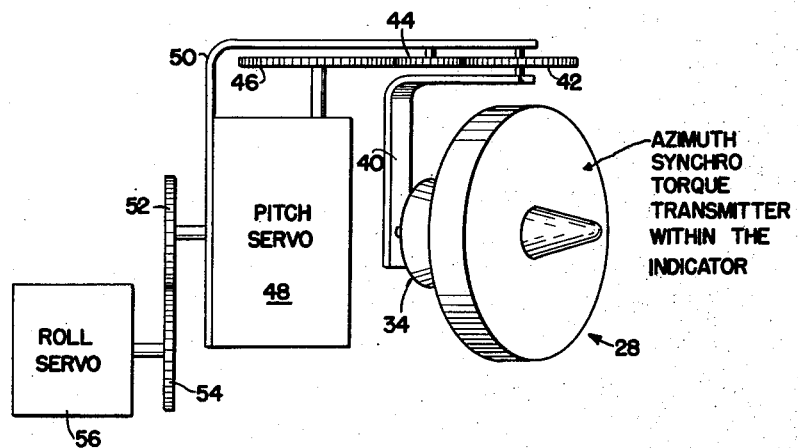
Figure 14:
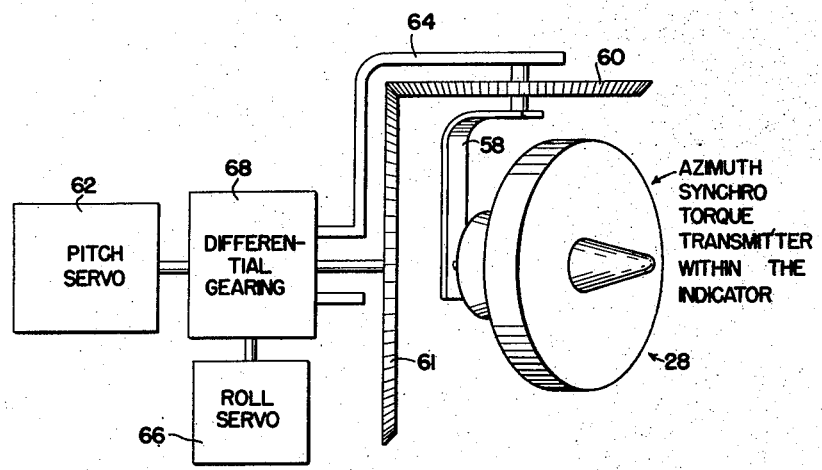

Figure 5 corresponds to position 5 of Figure 1;

Figure 6 corresponds to position 6 of Figure 1;

Figure 7 corresponds to position 7 of Figure 1 while the pilot is still on his back;

Figure 8 corresponds to position 8 of Figure 1 after the pilot has rolled out of the turn;

Figure 9 corresponds to position 9 of Figure 1 when the plane is once again flying straight and level but on a course 180° changed from the initial position 2;

Figure 10 is a view of the indicator when the craft is in a 45° left bank;

Figure 11 is a view of the indicator when the plane is in a 45° left bank and also in a 45° climb;

Figure 12 is a view of the indicator when the plane is in a vertical dive;

Figure 13 is a schematic of one type of gimbal drive for the subject all-attitude indicator, this drive giving maximum accuracy; and Figure 14 is a schematic of another mode of gimbal drive for the subject all-attitude indicator, this gimbal drive giving maximum response.

Referring now to Figure 1, numeral 20 depicts an aircraft flying horizontal in a northerly direction on a flight path 22. The flight path 22 depicts a Immelmann turn which essentially is a loop with the plane rolling out at the top of the loop so as to regain an upright horizontal position with the heading being changed 180° from the initial heading.

The improved all-attitude indicator used for indicating to the pilot his attitude during acrobatic maneuvers such as the Immelmann turn depicted in Figure 1 is shown in Figures 2–12. The improved all-attitude indicator comprises an instrument case 24 having a viewing window 26. An indicating device is movably supported in said case by a gimbal arrangement which might well be of the type shown in either Figures 13 or 14 for universal movement relative to the case. Indicating device 28 comprises a circular disc portion 30 which is characterized generally by having its axial length being substantially less than its diameter. Device 28 further has a right circular cone portion 32 coaxial with disc 30, cone portion 32 piercing the center of disc 30 so that disc 30 is positioned intermediate the base 34 and the apex 36 of cone portion 32.

Disc portion 30 is marked as shown on its edge and top and bottom with azimuth data.

The all-attitude indicating device 28 would be gyroscopically stabilized in pitch, roll, and azimuth by signals derived from a suitable gyro sensing apparatus such as a three axis gyro platform. Since the specific details of the gyroscopic apparatus are not a part of the present invention, they are not shown.

Schematic diagrams of the gimbaling mechanism suitable for supporting the indicating device 28 are shown in Figures 13 and 14. In order to achieve economical size, a synchro torque transmitter (or the equivalent) is utilized to drive the cone assembly about the azimuth axis and preferably is mounted integrally with it. In Figure 13, the indicating device 28 is supported through the base portion 34 of the cone portion 32 by a pitch gimbal 40 driven through suitable gearing means 42, 44, and 46 by a pitch servo 48 which in turn is mounted on a roll gimbal 50. The roll gimbal 50 is actuated through suitable gearing means 52, and 54 by a roll servo 56.

In Figure 14 the indicating device 28 is mounted on a pitch gimbal 58 which is driven through suitable gearing 60 by a pitch servo 62, the gearing 60 being mounted on a roll gimbal 64 which is driven by a suitable roll servomotor 66. The roll servo 66 and the pitch servo 62 drive through a differential 68 to actuate both the pitch 58 and the roll gimbal 64. If maximum dynamic response is desired, both servomotors for roll and pitch would be secured to the case of the instrument 24 and rotational inputs would be resolved as shown in Figure 14 through differential 68. The gearing back lash inherent in this type of arrangement makes necessary the sacrifice of a small amount of positional accuracy. If maximum positional accuracy is the criterion, only one servo would be fixed to the case (roll), and the other (pitch) would be mounted on the roll gimbal. This is the arrangement appearing in Figure 13.

Figure 3:
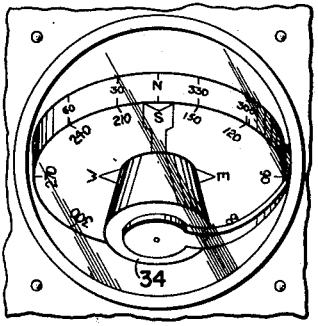
Figure 3 is the view of the indicator as seen by the pilot when the craft is in position 3 of Figure 1.
Figure 4:
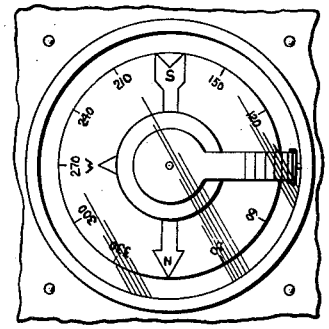
Figure 4 is the view that the pilot has of the indicator when the plane is in position 4 of Figure 1.

A study of Figures 2–12 reveals that at all times the pilot knows which way is "up" and also in which direction he is headed. For example, in Figure 2 the pilot knows that he is flying horizontal and in a northerly direction. In Figure 3 he knows that he is in a climb attitude while still heading north. In Figure 4 he knows that he is in a straight vertical climb. In Figure 5 the pilot knows that he is in a climb, nearing an upside down position, and headed south. In Figure 6 the pilot knows that he is headed south while flat on his back or upside down. In Figure 7 the pilot knows that he is in a dive while upside down and also headed south. In Figure 8 (after roll out) the pilot likewise knows that he is in a dive while right side up and in a southerly direction. In Figure 9 the pilot knows that he is once again flying straight and level and in a southerly direction.

Figures 10, 11 and 12 show other flight attitudes that might be encountered during acrobatic maneuvers.

While we have shown and described a specific embodiment of this invention, further modifications and improvements will appear to those skilled in the art. We desire to be understood, therefore, that this invention is not limited to the particular forms shown and we intend in the appended claims to cover all modifications which do not depart from the spirit and scope of this invention.

What we claim is:

1. In a dirigible craft, an attitude indicating instrument comprising an instrument case having a viewing window; an indicating device movably supported in said case adjacent to said window, said indicating device comprising a circular disc portion characterized by its axial length being substantially less than its diameter, and a right circular cone portion characterized by having an altitude substantially greater than said axial length of said disc portion, said cone portion extending through the center of said disc portion with the axes of said portions being coaxial and with said disc portion being positioned intermediate the base and apex of said cone portion; and means for moving said device relative to said case in accordance to the attitude of said craft.

2. In a dirigible craft, an attitude indicating instrument comprising an instrument case having a viewing window; an indicating device movably supported by a gimbal structure in said case adjacent to said window, said indicating device comprising a right circular disc portion characterized by its axial length being substantially less than its diameter, and a right circular cone portion characterized by having an altitude substantially greater than said axial length of said disc portion, said cone portion extending through the center of said disc portion with the axes of said portions being coaxial and with said disc portion being positioned intermediate the base and apex of said cone portion; and means for moving said device relative to said case in accordance to the attitude of said craft.

3. In a dirigible craft, an attitude indicating instrument comprising an instrument case having a viewing window; an indicating device universally supported in said case adjacent to said window, said indicating device comprising a disc portion, and a cone portion characterized by having a length substantially greater than the axial length of said disc portion, said cone portion extending through said disc portion and with said disc portion being positioned intermediate the base and apex of said cone portion; and means for moving said device relative to said case in accordance to the attitude of said craft.

4. In a dirigible craft, an attitude indicating instrument comprising an instrument case having a viewing window; an indicating device movably supported in said case adjacent to said window, said indicating device comprising a disc portion, and a cone portion extending through said disc portion; and means for moving said device relative to said case in accordance to the attitude of said craft.

5. In a dirigible craft, attitude indicating means comprising an instrument case having a viewing window, a conically shaped member in said case; and means including a gimbal structure in said case universally mounting said member adjacent to said window and first, second, and third motor means for rotating said member about three mutually perpendicular axes.

6. In a dirigible craft, attitude indicating means comprising an instrument case having a viewing window, a conically shaped member in said case; and means for supporting said member adjacent to said window and for universally driving said member including first motor means integral with said member for driving said member about its axis, and a gimbal structure having second and third motor means for driving said member about axes perpendicular to one another and to said axis of said member.

7. In a dirigible craft, attitude indicating means comprising an instrument case having a viewing window, a conically shaped member in said case; and means for supporting said member adjacent to said window and for universally driving said member including first motor means integral with said member for driving said member about its axis and means including gimbal means and second and third motor means mounted in part on said gimbal means and in part in said case for driving said member about axes perpendicular to one another and to said axis of said member.

8. In a dirigible craft, attitude indicating means comprising an instrument case having a viewing window, a conically shaped member in said case; and means for supporting said member adjacent to said window and for universally driving said member including first motor means integral with said member for driving said member about a first axis and means including gimbal means having second motor means mounted thereon and third motor means mounted in part on said gimbal means and in part in said case for driving said member about axes perpendicular to one another and to said first axis.

9. In a dirigible craft, an attitude indicating instrument comprising an instrument case having a viewing window; an indicating device movably supported in said case adjacent to said window, said indicating device comprising a conically shaped member; and means for causing relative movement between said device and said case in accordance to changes in the attitude of said dirigible craft.

10. In a dirigible craft, an attitude indicating instrument comprising an instrument case having a viewing window; an indicating device movably supported in said case adjacent to said window for rotation about a plurality of axes, said indicating device comprising a conically shaped member; and means for causing relative movement between said device and said case about said plurality of axes in accordance to changes in the attitude of said dirigible craft.

References Cited in the file of this patent
UNITED STATES PATENTS

| | | |
|---|---|---|
| 1,360,701 | Wotton | Nov. 30, 1920 |
| 2,424,570 | Jenks | July 29, 1947 |
| 2,636,161 | Hoover | Apr. 21, 1953 |